US009516292B2

(12) United States Patent
Bickerstaff et al.

(10) Patent No.: US 9,516,292 B2
(45) Date of Patent: Dec. 6, 2016

(54) IMAGE TRANSFER APPARATUS AND METHOD

(71) Applicant: Sony Computer Entertainment Europe Limited, London (GB)

(72) Inventors: Ian Henry Bickerstaff, London (GB); Simon Mark Benson, London (GB); Oliver Wright, London (GB)

(73) Assignee: Sony Computer Entertainment Europe Limited (GB)

( * ) Notice: Subject to any disclaimer, the term of this patent is extended or adjusted under 35 U.S.C. 154(b) by 848 days.

(21) Appl. No.: 13/650,404

(22) Filed: Oct. 12, 2012

(65) Prior Publication Data
US 2013/0093845 A1 Apr. 18, 2013

(30) Foreign Application Priority Data

Oct. 18, 2011 (GB) .................................. 1117932.2

(51) Int. Cl.
*H04N 13/00* (2006.01)
*H04N 13/04* (2006.01)

(52) U.S. Cl.
CPC ...... *H04N 13/0007* (2013.01); *H04N 13/0029* (2013.01); *H04N 13/0051* (2013.01); *H04N 13/0055* (2013.01); *H04N 13/0059* (2013.01); *H04N 13/0438* (2013.01); *H04N 2013/0463* (2013.01)

(58) Field of Classification Search
CPC ............ H04N 13/0007; H04N 13/0438; H04N 13/0051; H04N 13/0055; H04N 13/0029; H04N 13/0452; H04N 2013/046; H04N 7/144
See application file for complete search history.

(56) References Cited

U.S. PATENT DOCUMENTS

2006/0268104 A1\* 11/2006 Cowan ............... G02B 27/0018
348/42
2007/0097024 A1 5/2007 Jung et al.
(Continued)

FOREIGN PATENT DOCUMENTS

EP 1469382 A2 10/2004
EP 2365692 A2 9/2011
(Continued)

OTHER PUBLICATIONS

Extended European Search Report for Application No. 12161109.9 dated Apr. 15, 2015.
(Continued)

*Primary Examiner* — Sath V Perungavoor
*Assistant Examiner* — Clifford Hilaire
(74) *Attorney, Agent, or Firm* — Lerner, David, Littenberg, Krumholz & Mentlik, LLP

(57) ABSTRACT

An image transfer apparatus comprises an input operable to receive a signal comprising two images for different respective non-stereoscopic viewpoints of a virtual environment, a first output operable to transmit a signal comprising the two images formatted as a stereoscopic image to at least a first display, and a transmitter operable to transmit control signals to at least two active shutter glasses, the control signals arranged to allow respective wearers of the glasses to only view a respective one of the two images.

15 Claims, 5 Drawing Sheets

(56) References Cited

U.S. PATENT DOCUMENTS

| | | | | |
|---|---|---|---|---|
| 2007/0153122 | A1* | 7/2007 | Ayite | H04N 13/045 348/385.1 |
| 2010/0083341 | A1 | 4/2010 | Gonzalez | |
| 2010/0177017 | A1* | 7/2010 | Zeng | G06F 3/1431 345/1.1 |
| 2010/0309535 | A1* | 12/2010 | Landowski | G02B 27/2264 359/107 |
| 2011/0157309 | A1* | 6/2011 | Bennett | G06F 3/14 348/43 |
| 2011/0157334 | A1 | 6/2011 | Kim et al. | |
| 2011/0157339 | A1* | 6/2011 | Bennett | G06F 3/14 348/59 |

FOREIGN PATENT DOCUMENTS

| | | |
|---|---|---|
| EP | 2378785 A3 | 11/2011 |
| EP | 2398248 A2 | 12/2011 |
| GB | 2372164 A | 8/2002 |
| WO | 2007117485 A2 | 10/2007 |
| WO | 2012018669 A2 | 2/2012 |

OTHER PUBLICATIONS

British Examination Report for Application No. GB1117932.2 dated May 16, 2013.
British Combined Search and Examination Report for Application No. GB1117932.2 dated Feb. 3, 2012.
"New 3D Display and PS3 Accessories Debut at E3-PlayStation Blog," dated Jun. 6, 2011, retrieved form the Internet on Oct. 11, 2012 from <http://blog.us.playstation.com/2011/06/new-3d-display-and-ps3-accessories-debut-at-e3/>.
3DVISIONBLOG "LG's Dual Play Feature to be Available on LG Cinema 3D HDTVs", Sep. 2, 2011, Retrieved from the Internet Jan. 31, 2012, <http://3dvision-blog.com/lgs-dual-play-feature-to-be-available-on-lgcinema-3d-hdtvs/>, 4 pages.

* cited by examiner

IMAGE TRANSFER APPARATUS AND METHOD

CROSS REFERENCE TO RELATED APPLICATIONS

The present application claims the benefit of and priority to GB Application No. 1117932.2, filed Oct. 18, 2011, the entire disclosure of which is incorporated by reference herein.

BACKGROUND OF THE INVENTION

Field of the Invention

The present invention relates to a image transfer apparatus and method.

Description of the Prior Art

There is an ongoing desire to provide improved displays for videogame users. Recently this has resulted in the provision of 3D displays that use active shutter technology. Active shutter technology uses rapidly switching LCD panels in a pair of glasses make alternate lenses opaque to the TV display. When used in synchronisation with a 3DTV that shows rapidly alternating left and right views of a stereoscopic image, an apparent 3D image is perceived by the viewer. The 3D effect arises because only the viewer's left eye sees the left stereoscopic frame, and only the viewer's right eye sees the right stereoscopic frame.

Recently it has also been appreciated that this system can be used to provide separate full-screen monoscopic views for two players of a game on the same 3D TV. See for example http://blog.us.playstation.com/2011/06/06/new-3d-display-and-ps3-accessories-debut-at-e3/

In this case, the left and right images of a stereoscopic output are replaced with first and second viewpoints of first and second players of a game, and each player has a pair of active shutter glasses where, instead of the left and right lenses alternately becoming opaque, both lenses blink in synchrony with display of the respective player's viewpoint. As a result, both players can see a full-screen monoscopic image of the game from their own viewpoint on the same 3D TV.

However, there is still scope to exploit 3D TV signals in other ways.

The present invention seeks to address this opportunity.

SUMMARY OF THE INVENTION

In a first aspect, an image transfer apparatus is provided in accordance with claim 1.

In another aspect, a method of image transfer is provided in accordance with claim 11.

Further respective aspects and features of the invention are defined in the appended claims.

BRIEF DESCRIPTION OF THE DRAWINGS

The above and other objects, features and advantages of the invention will be apparent from to the following detailed description of illustrative embodiments which is to be read in connection with the accompanying drawings, in which.

DESCRIPTION OF THE PREFERRED EMBODIMENTS

An image transfer apparatus and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

The display arrangements described previously herein assume possession of a 3D TV that is capable of a dual-view mode, in order to allow two players to see respective full-screen images of a game. However, presently the proportion of 3D TVs in the market is small, and the proportion enabling a dual-view mode is smaller still, making access to this feature limited. This makes development of games that support a dual-view mode less attractive to developers. Consequently, it would be desirable either for such dual-view games to somehow be able to drive a conventional 3D TV, or to drive two separate conventional televisions, each providing a respective view of the game for one of two players.

To this end, a videogame console, such as the Sony® PlayStation® 3 (PS3®), could in theory separately drive two standard (monoscopic) televisions (i.e. one for each user/player) so as to allow two players to enjoy a respective full-screen experience. However, in practice the PS3 only comprises one HDMI-out port, meaning it cannot conventionally drive two standard TVs.

Figure 1:
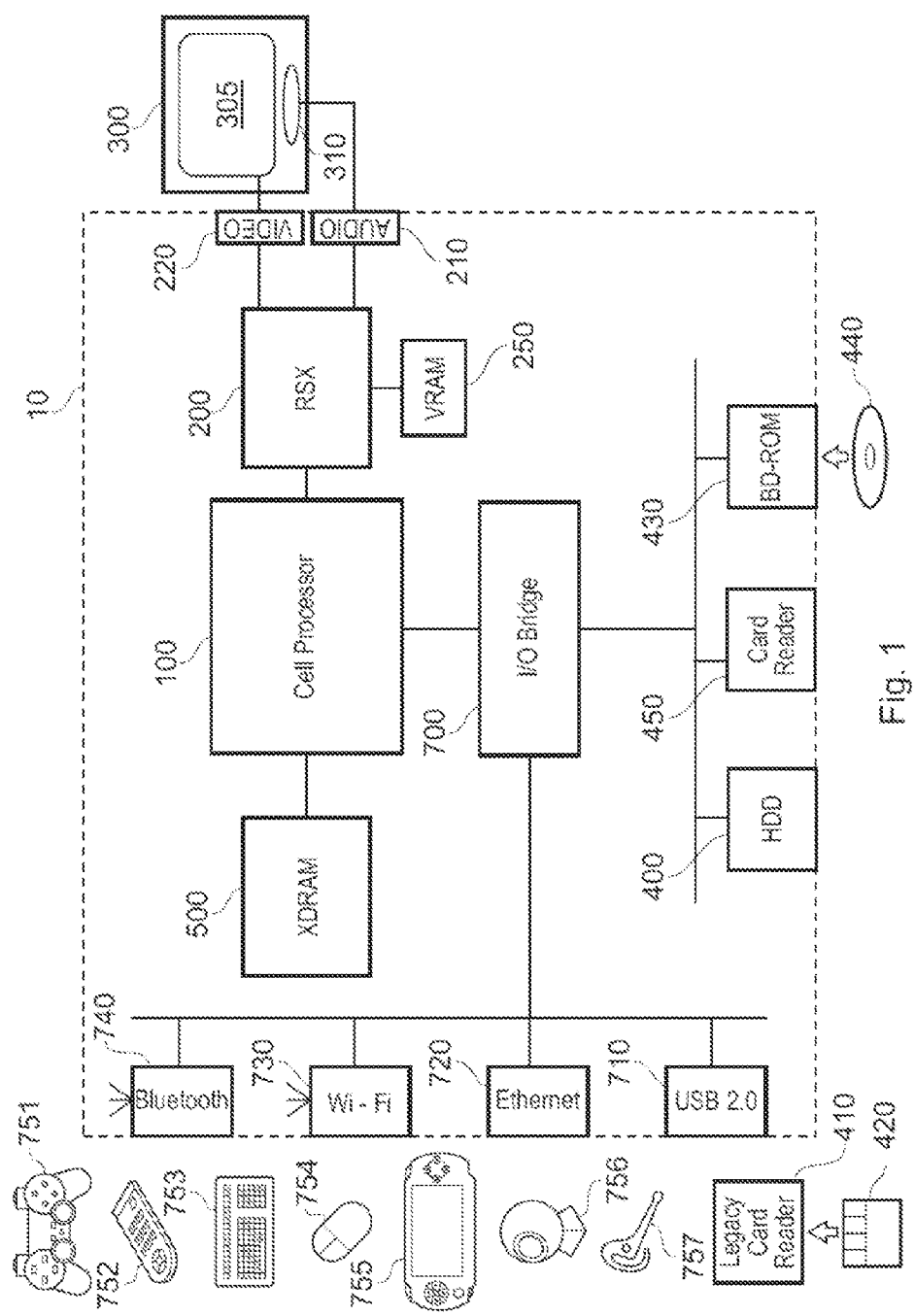
FIG. 1 is a schematic diagram of an entertainment device in accordance with an embodiment of the present invention.

Referring now to FIG. 1, this schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device or the Playstation Move® may be used as a controller. In the case of the Playstation Portable device, additional game or control information (for example, control instructions or number of lives) may be provided on the screen of the device.

In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and a High Definition Multimedia Interface (HDMI) output. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

As noted above, the standard PS3 comprises one HDMI-out port. Consequently whilst it can support one 3D TV, it cannot easily support two separate conventional displays.

Figure 2:
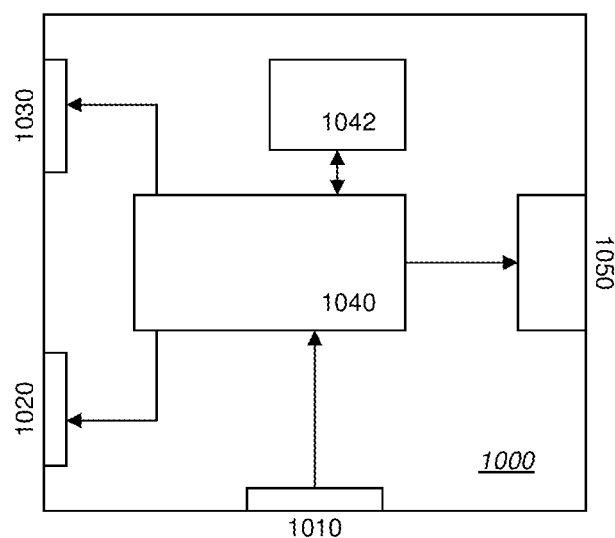
FIG. 2 is a schematic diagram of a signal splitter box in accordance with an embodiment of the present invention.

Turning now to FIG. 2, in an embodiment of the present invention an HDMI splitter box 1000 is connected to the PS3 (or any suitable source of videogame output) via an HDMI cable (not shown).

The splitter box comprises an HDMI input 1010, two HDMI outputs 1020, 1030, a splitter logic 1040 (such as a CPU and conventional associated support architecture, or a custom chip), and optionally an audio splitter logic 1042, which may be separate from or part of the splitter logic 1040. Also optionally, the splitter box may comprise a transmitter 1050 for transmitting control signals to active shutter glasses. The transmitter may be optical (e.g. using infra-red signals) or use wireless radio (e.g. Bluetooth®).

In an embodiment of the present invention, the splitter box may contain its own extended display identification data (EDID), enabling the PS3 (or other suitable devices) to query the splitter box, for example to determine what modes and capabilities it has. This EDID may be provided by a separate chip (not shown) generated by the splitter logic.

In an embodiment of the present invention the splitter box is operable in each of a plurality of modes having different capabilities. Modes may be selected by analysis of the signal received by the HDMI input, based upon existing HDMI protocols. Alternately or in addition, modes may be explicitly selected by the PS3 using predetermined signals via the HDMI cable, or where a Bluetooth communication system is provided in the splitter box, via Bluetooth. Alternatively or in addition, user inputs for mode selection may be provided on the box and/or via a user remote control.

The modes affect how signals are sent to a primary display and, where used, a secondary display. Some modes are intended for use with one display (typically a 3D TV), whilst others are intended for use with two displays (typically two conventional displays, such as conventional TVs or monitors).

Modes for Use with One Display

Standard 3D TV Mode

In an embodiment of the present invention, the splitter box provides in a standard 3D TV mode. In this mode, the splitter box EDID identifies to the PS3 that it is able to receive a conventional 3D TV signal. In addition, optionally the splitter logic reads the supported video modes from the display. The supported video modes are then reported by the splitter logic to the PS3. This enables the PS3 to output a 3D TV image in a mode compatible with the display.

The splitter box then receives a conventional 3D TV signal at the HDMI input and, providing it corresponds to one of the reported supported video modes, it relays it to the display.

3D TV dual view mode

As noted above, a 3D TV may not support a dual-view mode in which two monoscopic (non-stereoscopic) images are tow be view by two respective users or groups of users.

In an embodiment of the present invention the splitter box supports a 3D TV dual view mode. In this mode, the splitter box EDID identifies to the PS3 that it is able to receive a dual-view 3D TV signal. In addition, optionally the splitter logic reads the supported video modes from the display. The supported video modes are then reported by the splitter logic to the PS3.

Meanwhile, the splitter box identifies itself to the conventional 3D TV as a conventional 3D TV signal source.

The PS3 then transmits a dual view signal as a 3D signal in a conventional manner, and this is sent via the splitter box to the 3D TV, which displays it as if it is a conventional 3D image. Hence, as noted previously, the signal is nominally a 3D TV signal, but where the left and right stereoscopic images are conventionally encoded, the signal instead contains first and second player viewpoints.

However, the conventional 3D TV is not capable of dual-view display. More specifically, a conventional 3D TV is arranged to send control signals to all paired active shutter glasses to alternate between left and right lenses in sync with alternate displayed images. However, this is the incorrect approach for a dual view signal, as it would result in both players seeing a confused jumble of images from both viewpoints.

Consequently, where the splitter logic has detected that the 3D TV is not capable of dual view (for example by analysis of the 3D TV's EDID data) then in an embodiment of the present invention the splitter box (via Bluetooth, as a non-limiting example), sends a different set of control signals to the active shutter glasses, telling respective active shutter glasses to blink (i.e. make opaque) both lenses in sync with every other image, so as to only see a respective one of the dual views.

When using Bluetooth in this way, consequently advantageously the same pair of active shutter glasses can be used for both conventional 3D viewing and in dual view mode, depending upon whether they were paired under Bluetooth with the TV or with the splitter box.

Alternatively or in addition, the splitter logic may signal to the PS3 to generate these Bluetooth control signals.

Figure 3A:
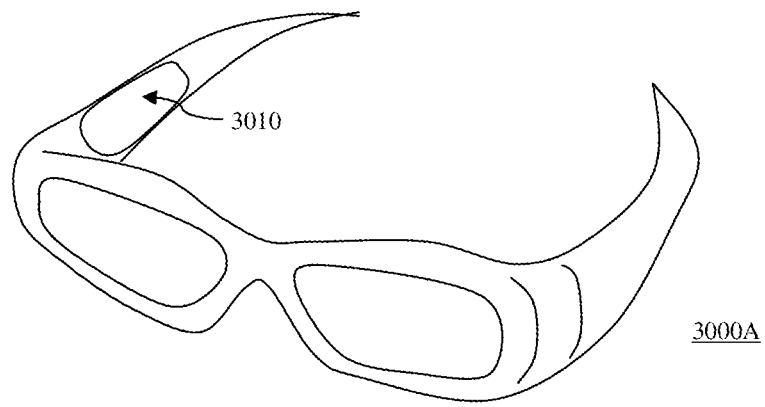
FIGS. 3A and 3B are schematic diagrams of active shutter glasses in accordance with embodiments of the present invention.

Referring to FIG. 3A, active shutter glasses 3000A comprise a Bluetooth receiver 3010 operable to pair with either a TV or the splitter box (or the PS3, as applicable). A button to activate the pairing process may also be provided (not shown).

In this way, the splitter box in combination with a conventional 3D TV can provide a dual-view capability on that 3D TV.

Figure 3B:
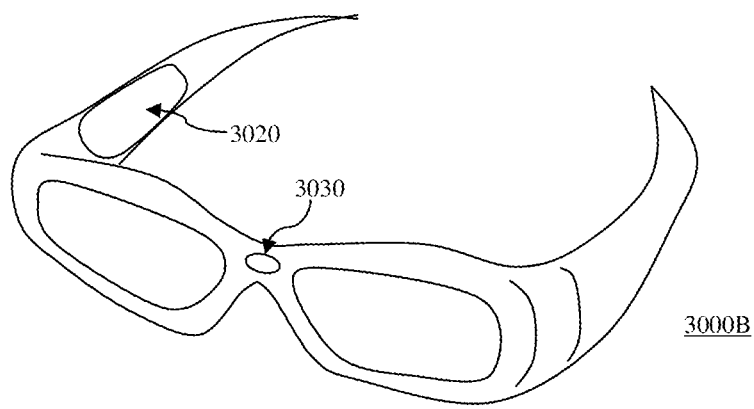

As an alternative to Bluetooth, referring now also to FIG. 3B, a pair of active shutter glasses 3000B may comprise an infra-red receiver 3030 and be controlled by infra-red signals. In this case it is not possible to explicitly pair the glasses to the device instead of the TV. Hence in this case the glasses could still receive infra-red control signals from the TV. However, the splitter box can nevertheless transmit infra-red signals of its own. A signal detector logic 3020 in the glasses is then arranged to distinguish both signal types (e.g. by correlation with stored templates) and where the splitter box's signal is detected in addition to the TV's, then the signal detector logic can be arranged to give preference to the control signals from the splitter box. In this way the glasses can switch from a default 3D mode controlled by the TV to a dual-view mode controlled by the splitter box when the splitter box is in this mode.

Modes for Use with Two Displays

For convenience, one may consider the two displays to be a primary display and a secondary display. Typically the primary display may be a main display that is permanently connected to the splitter box, whilst the secondary display is a visiting display temporarily connected to the splitter box (for example a smaller portable TV brought by a friend). However it will be appreciated that this is merely an example.

In practice, which display is treated as the primary display may be based on a number of factors. For example, in 3D TV modes the primary display may taken to be only one of two displays that is capable of displaying 3D TV signals. Similarly, the primary display may be taken to be the one reporting the largest screen size and/or highest native resolution. Alternatively, the primary display may be defined as the display connected to a particular one of the HDMI outputs, which may consequently be marked as being for a primary display. Similarly, a user-operable switch or remote control option may allow the user to specify which display is the primary display.

Notably the two displays may be of different sizes, and may also have different capabilities, such as different native resolutions.

Standard TV Splitter Mode

In an embodiment of the present invention the splitter box supports a standard TV splitter mode. In this mode the splitter box EDID reports that the splitter box is a conventional HDMI receiver, and the splitter box takes a standard (monoscopic) HDMI signal received at the HDMI input. In this mode, the splitter logic simply duplicates the signal for both HDMI outputs, thereby enabling identical display of the signal on two displays.

In addition, optionally the splitter logic reads the supported video modes from the primary display and reports these to the PS3 in a similar manner to that for the standard 3D TV mode discussed previously.

Optionally, splitter logic also reads the supported video modes of the secondary display, and compares these with the modes of the primary display. The splitter logic then only reports to the PS3 those modes found in common between the primary and secondary displays. This advantageously ensures that the PS3's output will be visible on both displays. This may be a factor when, for example, a smaller secondary TV is only capable of a 720p resolution, whilst the primary display is also capable of 1080p resolution.

3D TV Splitter Mode

In an embodiment of the present invention the splitter box supports a 3D TV splitter mode. In this mode, the splitter box EDID identifies to the PS3 that it is able to receive a conventional 3D TV signal. The splitter box then operates in a similar manner to the standard splitter mode above, but using a 3D TV signal as an input. Consequently the 3D TV signal is duplicated and sent to the HDMI outputs.

In an embodiment of the present invention, optionally the splitter logic reads the supported video modes of both displays. If the splitter logic detects that only one of the displays is a 3D TV, whilst the other display is a conventional (monoscopic) TV, then the splitter logic splits the signal to provide the 3D TV with the 3D TV signal, and to provide the conventional display with only one of the stereoscopic pair of images. In this case optionally image processing means may be included in the splitter logic to extract and/or format the provided image in a manner supported by the conventional television. Such stereo to mono conversion techniques are discussed later herein.

Conventional TV Dual-View Splitter Mode

In an embodiment of the present invention the splitter box supports a conventional TV dual-view splitter mode. Like the 3D TV dual-view mode, the output from the PS3 is a dual view 3D TV signal. Again, as noted previously, this signal is nominally a 3D TV signal, but where the left and right stereoscopic images are conventionally encoded, the signal instead contains first and second player viewpoints.

In this mode, the splitter box EDID identifies to the PS3 that it is able to receive a dual-view 3D TV signal. Consequently the PS3 operates as it if is connected to a dual-view capable 3D TV. Meanwhile, the splitter box identifies itself to each of two connected TVs as a conventional (monoscopic) HDMI source.

In use, the PS3 runs a dual-view capable application, such as a game. The PS3 then operates as though it is connected to a dual-view capable 3D TV, and outputs a dual-view 3D TV image for the viewpoints of first and second players of the game, as described previously.

In this case, the splitter logic provides the conventional primary and secondary displays respectively with alternate frames of the 3D TV image corresponding to the alternate viewpoints, formatted as conventional (monoscopic) HDMI television signals.

That is to say, the splitter logic consistently extracts image frames corresponding to the viewpoint of the first player and supplies these to one of the primary and secondary displays as a conventional monoscopic image, and also consistently extracts image frames corresponding to the viewpoint of the second player and supplies these to the other of the primary and secondary displays as a conventional monoscopic image.

The specific manner of extraction will vary depending on how the stereoscopic image signal, as used by the dual-view system, is formatted. For the avoidance of doubt, whilst the signal may still be referred to as a stereoscopic image signal, it will be understood that the actual content carried by this signal is not stereoscopic but is a dual-view image signal as described previously.

Consequently the splitter logic may support one or more of the following stereo-to-mono extraction (conversion) modes:

Where the first and second dual-view images are interleaved in a progressive scan image, the extraction process extracts alternate lines of the progressive scan to form two conventional interlaced images, one for each display. Hence an input 1080p stereoscopic image signal results in two 1080i mono image outputs.

Where the first and second dual-view images are vertically compressed and stacked in a progressive scan image, the top and bottom halves of this image are separated and vertically expanded to form two conventional interlaced images, one for each display. Hence again a 1080p stereoscopic image signal input results in two 1080i mono image outputs.

Where the left and right stereo images are presented as alternating separate image frames over time, then these alternate frames are extracted as a whole to form respective images, one for each display. Hence a 1080p stereoscopic image signal input results in two 1080p mono image outputs each at a half frame rate, or a 1080i stereoscopic image signal input results in two 1080i mono image outputs each at a half frame rate. Since in this case the source frame rate will be double the conventional frame rate, the resultant two mono outputs will be generated at the conventional frame rate.

In each extraction mode, appropriate modifications to the header and/or data structure of the mono output images may be implemented. For example, metadata associated with the image may be changed to indicate that the resulting image frame is a conventional interlaced image frame in a format recognised by the intended display.

Other formats and extraction modes may be apparent to the skilled person. For example the left and right stereo images may be horizontally compressed and transmitted side by side in an image. In this case the left and right halves can be separated and horizontally expanded to form two images.

In short, the splitter box implements the separation of the 3D images that is normally implemented by a 3D TV, and additionally provides a suitable data wrapper to forward the two separated images as a conventional monoscopic images to a respective display.

Moreover, advantageously this process is transparent to the PS3. Consequently with the splitter box connected, the PS3 can generate dual-view 3D signals that are usable by a dual-view capable 3D TV, or a conventional 3D TV whose active shutter glasses can be paired to the splitter box, or to two conventional monoscopic TVs. As a result the number of people who are able to use the dual view capability of a game is increased, making provision of such a facility more attractive to game developers.

Figure 4:
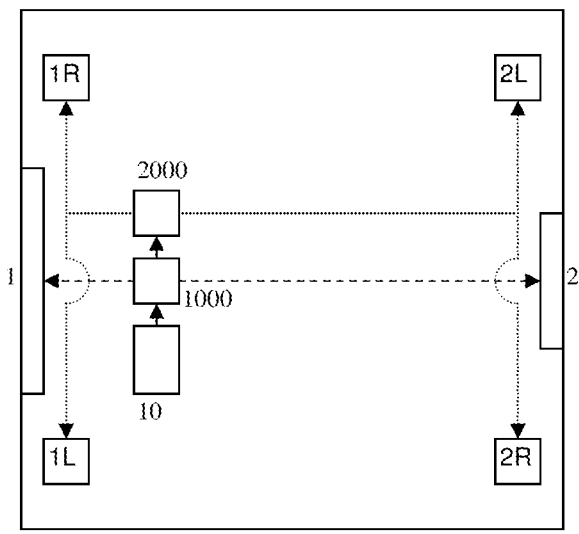
FIG. 4 is a schematic diagram of a surround sound configuration in accordance with an embodiment of the present invention.
Figure 5:
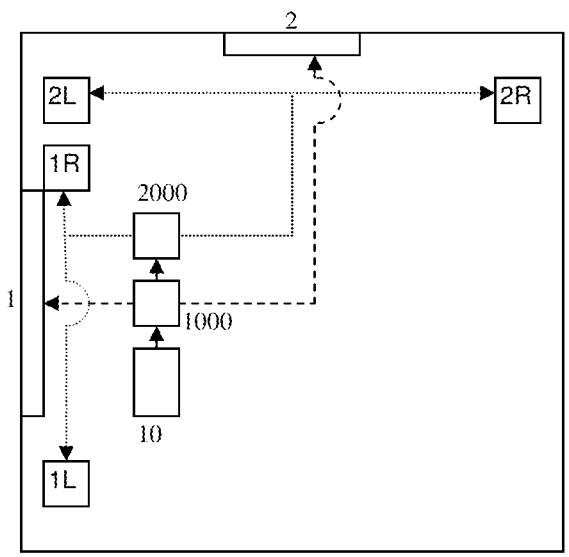
FIG. 5 is a schematic diagram of a surround sound configuration in accordance with an embodiment of the present invention.

Referring now also to FIGS. 4 and 5, in the conventional TV dual-view splitter mode, it will be appreciated that the respective displays may have their own loudspeaker systems.

This provides the opportunity to also generate respective audio separately for the different viewpoints of the players, such that audio for the position of a first player within the game environment is played by their display, whilst audio for the position of a second player within the game environment is played by the other display. This provides for a more immersive experience than if the common audio normally sent to a dual-view 3D TV is also sent to both conventional TVs.

Consequently in a further embodiment of the present invention, the PS3 is operable in a corresponding conventional TV dual-view splitter mode to format the audio signal that it outputs on the single HDMI channel to enable the audio splitter logic of the splitter box to generate separate audio for the two conventional displays.

In particular, where the HDMI audio supports 5.1 or 7.1 channel surround sound, a predetermined four of these channels can instead be supplied with two pairs of stereo audio signals corresponding to the audio appropriate to the position of each of the two players in the videogame.

The audio splitter logic of the splitter box is then operable to extract these two stereo audio signals from the 5.1 or 7.1 audio signal received from the PS3, and respectively incorporates them into the HDMI signal being transmitted to the respective display.

It will be appreciated that any four channels may be selected for this purpose, but a preferred mapping is as follows:

For the primary display 1, map a left stereo channel 1L to the left front speaker channel, and a right stereo channel 1R to the right front speaker channel. Meanwhile for the secondary display 2, map a left stereo channel 2L to the right rear speaker channel, and a right stereo channel 2R to the left rear speaker channel. Notably, the left/right channels for the secondary display are apparently reversed in this configuration.

Whilst the splitter box can extract these channels and provide them to the primary and secondary displays (with the stereo signals for the secondary display being reversed to be the correct way around), this mapping means that if a user routes (or also routes) their HDMI signal via a multimedia amplifier 2000, then the resulting deployment of the two stereo signals within a 5.1 or 7.1 speaker configuration would enable the secondary display to be mounted between the rear speakers of such a configuration and in that position enjoy apparently correct stereo reproduction.

This arrangement is illustrated in FIG. 4.

It will be appreciated that other arrangements may be possible. For example, in a 5.1 system the stereo signal for the primary display could be sent on the left front and centre front channels, whilst the stereo signal for the secondary display could be sent with the left signal on the right front channel and the right signal on the right rear channel, so that the players and displays could be mounted at 90 degrees to each other.

This arrangement is illustrated in FIG. 5.

Consequently in an embodiment of the present invention, the PS3 is operable (either under instruction from the OS or the dual-view enabled game itself) to allow the users to specify the position of the secondary display in the case where audio will be sent to a 5.1 or 7.1 surround-sound system, so that the PS3 can select an appropriate set of channels to generate respective stereo sound on the system consistent with the position of the displays.

Hence in conjunction with the PS3 (or any suitable games system) the splitter box can drive either just the loudspeakers of the displays, or a separate 5.1 or 7.1 loudspeaker system, or both.

Finally, in an embodiment of the present invention, the components of the splitter box as described herein may form part of a more general peripheral device for an entertainment device such as the PS3 (or vice versa). For example, the components of the splitter box may form part of a digital video broadcast TV receiver such as the Sony® PlayTV® or PlayTV 2 peripheral, which receives DVB broadcasts and sends them to the PS3 for display or recording, and which is controlled by the PS3. In this case the HDMI input 1010 may be replaced by or supplemented with a USB input/output port. In addition, the receiver may also act as a further video image source for conventional and 3D TV images to be split as described herein by the splitter logic. In this case the received signal may be passed directly to the splitter logic, or the signal may be sent to the PS3 for processing and then received back from the Playstation 3 via the HDMI input 1010, optionally augmented by additional image data such as an electronic program guide. In either case the Playstation 3 will remain the source of dual-view videogame images for splitting or display as described herein.

Hence in a summary embodiment for a splitter box operating, for example, in conjunction with a 3D TV and a PS3, the splitter box operates as an image transfer apparatus in 3DTV Dual View mode, and comprises an input (e.g. an HDMI input 1010) operable to receive a signal comprising two non-stereoscopic images for different respective viewpoints of a virtual environment (i.e. a dual-view signal). In addition it comprises at least a first output (e.g. an HDMI output 1020 or 1030) operable to transmit a signal comprising the two non-stereoscopic images formatted as a stereoscopic image to at least a first display. As noted above, this can be achieved by use of EDID signals to the display and also any known modification of header data or data formatting required to be compatible with expected 3D TV signals. In addition, the splitter box comprises transmitter 1050 operable to transmit control signals to at least two active shutter glasses, the control signals arranged to allow respective wearers of the glasses to only view a respective one of the two non-stereoscopic images.

In more detail, in this mode the splitter box is arranged to transmit extended display identification data to a source of the received signal, the data indicating that the apparatus is capable of dual-view display of the two images, and in which the apparatus is arranged to transmit extended display identification data to a recipient of the transmitted signal, the data indicating that the apparatus is a source of 3DTV signals.

As noted previously, the transmitter 1050 may be operable to transmit radio control signals to two or more active shutter glasses paired to the transmitter using a wireless protocol, or may be operable to transmit infra-red control signals.

In this way, the splitter box enables conventional 3D TVs to be used for dual-view gaming by having a 3D TV dual view mode. Such a splitter box may also support other modes, such as the 3D TV splitter mode and the conventional TV dual-view splitter mode.

Hence in this summary embodiment, for the 3D TV splitter mode the splitter box operates as an image transfer apparatus also comprises a second output (the other of HDMI outputs 1020 and 1030) and the signal splitter logic (1040). The signal splitter logic is operable to duplicate the signal for routing to the two outputs, and output the signal to a display detected as a 3D display. To accommodate the possibility that only one of the TV's connected to the splitter box is a 3D TV (for example the primary display), the signal splitter logic is also operable to detect a whether a display connected to each output is a 3D display, and to convert the signal to a monoscopic signal for output to a display detected as being a conventional 2D display.

Meanwhile, in this summary embodiment, for the conventional TV dual-view splitter mode the splitter box operates as an image transfer apparatus also comprising a second output (the other of HDMI outputs 1020 and 1030) and the signal splitter logic (1040). In this case, the signal splitter logic is operable to extract and separate the two images of the dual-view image from the received signal, and to format each of the two separated images for reception by a respective conventional 2D display. Again, this may involve use of suitable EDID signals to the displays and also any known modification of header data or data formatting required to be compatible with expected conventional 2D TV signals. Then a respective one of the two separate images is output to the first and second outputs for transmission to the respective conventional TVs.

As noted previously, in this mode the splitter box can also provide separate audio for the two displays if available. Hence the splitter box may comprise an audio splitter logic 1042 (which as noted previously may simply be part of the main signal splitter logic 1040). The audio splitter logic is then operable as described previously to extract and separate two stereo audio signals from a surround-sound signal (e.g. one forming part of dual-view signal received at HDMI input 1010). The splitter box can then send to the first output and the second output a respective one of the two separated stereo audio signals.

As noted previously, the splitter box may be part of a device such as the Sony PlayTV peripheral, and hence comprise at least a first digital video broadcast receiver, which is operable send received digital video broadcast signals to the splitter logic, and also operable to send the received digital video broadcast signals to the PS3 (i.e. the source of received signals comprising two non-stereoscopic images in other modes of operation).

In use, the splitter box will form part of an audio-visual system, which typically comprises the splitter box 1000 itself operating as image transfer apparatus, an entertainment device 10 such as the PS3 operable to generate the two images for different respective viewpoints of a virtual environment as used in dual-view games, and two or more active shutter glasses 3000A, 3000B.

As noted previously these active shutter glasses comprise a receiver (3010, 3030) operable to receive one or more of an infra-red signal transmitted from the image transfer apparatus, a radio signal (e.g. Bluetooth®) transmitted from the image transfer apparatus, and a similar radio signal transmitted from the entertainment device. Again as noted previously the glasses may be controlled either by the TV (for conventional 3D TV viewing) or by the splitter box or PS3 (for dual-view TV viewing), either by Bluetooth pairing or by parsing infra-red signals. Hence the active shutter glasses may be operable to receive control signals from a display device or from one of the image transfer apparatus and the entertainment device.

Figure 6:
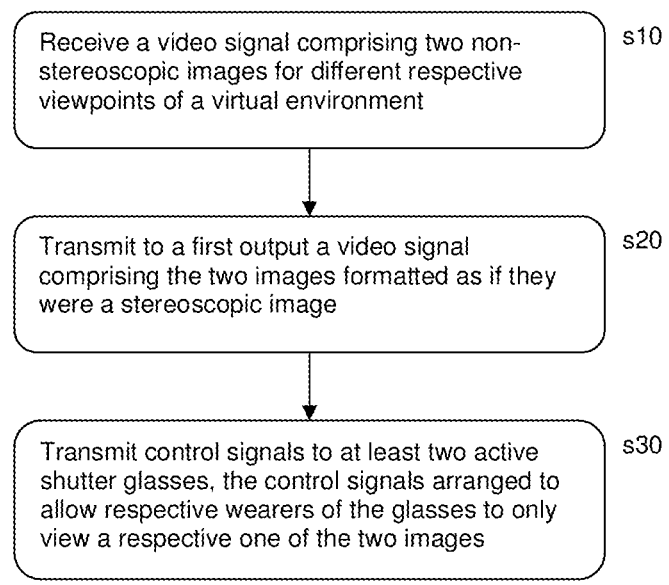
FIG. 6 is a flow diagram of a method of image transfer in accordance with an embodiment of the present invention.

Referring now to FIG. 6, a method of image transfer comprises:

In a first step s10, receiving a video signal comprising two non-stereoscopic images for different respective viewpoints of a virtual environment;

In a second step s20, transmitting to a first output a video signal comprising the two images formatted as if they were a stereoscopic image; and In a third step s30, transmitting control signals to at least two active shutter glasses, the control signals arranged to allow respective wearers of the glasses to only view a respective one of the two images.

It will be apparent to a person skilled in the art that variations in the above method corresponding to operation of the various embodiments of the apparatus as described and claimed herein are considered within the scope of the present invention, including but not limited to:

transmitting extended display identification data to a source of the received signal, the data indicating a capability for dual-view display of the two images, and transmitting extended display identification data to a recipient of the transmitted signal, the data indicating that the transmitted signal is a source of 3D TV signals;

operating in a mode that implements the steps of extracting and separating the two images from the received signal, formatting each of the two separate images for reception by a respective conventional 2D display, and transmitting to the first output and a second output a respective one of the two separate images; and operating in a mode that implements the steps of detecting a whether a display connected the first output and a second output is a 3D display, receiving a signal comprising a true stereoscopic pair of images for display on a 3D display, duplicating the signal for routing to the two outputs, transmitting the signal to a connected display detected as a 3D display, and converting the signal to a monoscopic signal for output to a connected display detected as a conventional 2D display.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An image transfer system, comprising:
   an input configured to receive a signal from a source, the received signal comprising two non-stereoscopic images for different respective viewpoints of a virtual environment, wherein the two non-stereoscopic images do not form a stereoscopic pair;
   a first output configured to transmit a signal comprising the two non-stereoscopic images formatted as a stereoscopic image to at least a first 3D display that does not support a dual-view mode;
   a signal splitter logic operatively coupled to the input and the first output, the signal splitter logic being configured to:
      identify one or more supported video modes of the at least the first 3D display, and
      operate the system in either a first mode or a second mode in accordance with the one or more supported video modes, in which the first mode provides a 3D display signal and the second mode provides one or more dual-view control signals;
   an entertainment device operable to generate the two images for different respective viewpoints of a virtual environment; and
   two or more active shutter glasses, in which the active shutter glasses comprise a receiver operable to receive one or more selected from the list consisting of:
      i. an infra-red signal transmitted from the image transfer system,
      ii. a radio signal transmitted from the image transfer system, and
      iii. a radio signal transmitted from the entertainment device;
   in which the system is configured to identify itself to the source of the received signal as capable of dual-view display of the two images, and configured to identify itself to the first 3D display as a source of a conventional 3D TV signal.

2. An image transfer system according to claim 1, in which the apparatus is arranged to transmit extended display identification data to the source of the received signal, the data indicating that the apparatus is capable of dual-view display of the two images, and in which the apparatus is arranged to transmit extended display identification data to a recipient of the transmitted signal, the data indicating that the apparatus is a source of 3D TV signals.

3. An image transfer system according to claim 1, comprising a transmitter operable to transmit the dual-view control signals to at least two active shutter glasses, the dual-view control signals arranged to allow respective wearers of the glasses to only view a respective one of the two non-stereoscopic images.

4. An image transfer according to claim 3, in which the transmitter is operable to transmit radio control signals to two or more active shutter glasses paired to the transmitter using a wireless protocol.

5. An image transfer system according to claim 1, comprising:
   a second output; and
   wherein the signal splitter logic is configured:
      to extract and separate the two images from the received signal;
      to format each of the two separated images for reception by a respective conventional 2D display; and
      to output to the first output and the second output a respective one of the two separate images.

6. An image transfer system according to claim 5, comprising:
   an audio splitter logic; and in which
   the audio splitter logic is operable:
      to extract and separate two stereo audio signals from a surround-sound signal forming part of the received signal comprising two images; and
      to output to the first output and the second output a respective one of the two separated stereo audio signals.

7. An image transfer system according claim 1, comprising:
   a second output; and
   wherein the signal splitter logic is configured to detect a whether a display connected to each output is a 3D display; and in which
   the input is operable to receive a signal comprising a true stereoscopic pair of images for display on a 3D display; and
   the signal splitter logic is configured:
      to duplicate the signal for routing to the two outputs,
      to output the signal to a display detected as a 3D display, and
      to convert the signal to a monoscopic signal for output to a display detected as a conventional 2D display.

8. An image transfer system according to claim 1, comprising:
   a digital video broadcast receiver for receiving digital video broadcast signals; and in which
   the receiver is operable send received digital video broadcast signals to a source of the received signal comprising two non-stereoscopic images.

9. An image transfer apparatus system according to claim 1, in which the active shutter glasses are operable to receive control signals from a display device or from one of the image transfer apparatus and the entertainment device.

10. A method of image transfer for an image transfer apparatus, comprising the steps of:
    receiving a video signal from a source, the received video signal comprising two non-stereoscopic images for different respective viewpoints of a virtual environment, wherein the two non-stereoscopic images do not form a stereoscopic pair;

transmitting to a first output a video signal comprising the two non-stereoscopic images formatted as if they were a stereoscopic image to at least a first 3D display that does not support a dual-view mode;

identifying one or more supported video modes of the at least the first 3D display;

operating the apparatus in either a first mode or a second mode in accordance with the one or more supported video modes, in which the first mode provides a 3D display signal and the second mode provides one or more dual-view control signals;

identifying the image transfer apparatus to the source of the received video signal as capable of dual-view display of the two images;

identifying the image transfer apparatus to the at least first 3D display as a source of a conventional 3D TV signal;

generating the two images for different respective viewpoints of a virtual environment; and receiving one or more selected from the list consisting of:
 i. an infra-red signal transmitted from the image transfer apparatus,
 ii. a radio signal transmitted from the image transfer apparatus, and
 iii. a radio signal transmitted from an entertainment device.

11. A method of image transfer according to claim 10, comprising the step of transmitting the dual-view control signals to at least two active shutter glasses, the dual-view control signals arranged to allow respective wearers of the glasses to only view a respective one of the two non-stereoscopic images.

12. A method of image transfer according to claim 10, comprising the steps of:

transmitting extended display identification data to a source of the received signal, the data indicating a capability for dual-view display of the two images; and transmitting extended display identification data to a recipient of the transmitted signal, the data indicating that the transmitted signal is a source of 3D TV signals.

13. A method of image transfer according to claim 10, comprising the steps of:

extracting and separating the two images from the received signal;

formatting each of the two separate images for reception by a respective conventional 2D display; and transmitting to the first output and a second output a respective one of the two separate images.

14. A method of image transfer according to claim 10, comprising the steps of:

detecting a whether a display connected the first output and a second output is a 3D display;

receiving a signal comprising a true stereoscopic pair of images for display on a 3D display;

duplicating the signal for routing to the two outputs;

transmitting the signal to a connected display detected as a 3D display; and converting the signal to a monoscopic signal for output to a connected display detected as a conventional 2D display.

15. A non-transitory computer-readable recording medium recorded with a computer program, the computer program, when executed by a processor, causes the processor to implement the method of claim 10.

* * * * *